(12) United States Patent
Jeon

(10) Patent No.: US 10,720,050 B2
(45) Date of Patent: Jul. 21, 2020

(54) PREDICTING SAFETY INCIDENTS USING MACHINE LEARNING

(71) Applicant: Uber Technologies, Inc., San Francisco, CA (US)

(72) Inventor: Sangick Jeon, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 713 days.

(21) Appl. No.: 15/297,050

(22) Filed: Oct. 18, 2016

(65) Prior Publication Data
US 2018/0107935 A1 Apr. 19, 2018

(51) Int. Cl.
*G08G 1/01* (2006.01)
*G08G 1/00* (2006.01)
*G06N 20/00* (2019.01)

(52) U.S. Cl.
CPC .......... *G08G 1/0141* (2013.01); *G08G 1/012* (2013.01); *G08G 1/0129* (2013.01); *G08G 1/20* (2013.01); *G08G 1/202* (2013.01); *G06N 20/00* (2019.01)

(58) Field of Classification Search
CPC ..... B60W 30/00; G08G 1/012; G08G 1/0129; G08G 1/0141; G08G 1/20; G08G 1/202; G06N 20/00; G06N 99/005
See application file for complete search history.

(56) References Cited

U.S. PATENT DOCUMENTS 7,710,248 B2 * 5/2010 Greene .................. G08G 1/166
340/436
8,731,770 B2 5/2014 Fischer
9,477,639 B2 10/2016 Fischer et al.
(Continued)

FOREIGN PATENT DOCUMENTS

| JP | 2010-067234 A | 3/2010 |
| KR | 10-2006-0058793 A | 6/2006 |
| KR | 10-2009-0054171 A | 5/2009 |

OTHER PUBLICATIONS

D'Souza et. al., "Multivariate Statistical Analysis of Public Transit Bus Driver Distraction", Journal of Public Transportation, vol. 15, No. 3, 2012 (Year: 2012).*
(Continued)

*Primary Examiner* — Li B. Zhen
*Assistant Examiner* — Selene A. Haedi
(74) *Attorney, Agent, or Firm* — Fenwick & West LLP

(57) ABSTRACT

A safety system associated with a travel coordination system collects safety data describing safety incidents by providers and generates a plurality of safety incident prediction models using the safety data. The safety incident prediction models predict likelihoods that providers in the computerized travel coordination system will be involved in safety incidents. Two types of safety incidents predicted by the safety system include dangerous driving incidents and interpersonal conflict incidents. The safety system uses the plurality of safety incident prediction models to generate a set of predictions indicating probabilities that a given provider in the travel coordination system will be involved in a safety incident in the future. The safety system selects a safety intervention for the given provider responsive to the set of predictions and performs the selected safety intervention on the given provider.

14 Claims, 5 Drawing Sheets

(56) References Cited

U.S. PATENT DOCUMENTS

| | | | |
|---|---|---|---|
| 9,718,468 B2* | 8/2017 | Barfield, Jr. | B60W 30/095 |
| 2011/0077028 A1* | 3/2011 | Wilkes, III | B60W 50/14 |
| | | | 455/456.3 |
| 2012/0233246 A1* | 9/2012 | Guemez | G06Q 40/00 |
| | | | 709/203 |
| 2015/0213555 A1* | 7/2015 | Barfield, Jr. | G06Q 40/08 |
| | | | 705/4 |
| 2016/0046298 A1 | 2/2016 | Deruyck et al. | |
| 2016/0101728 A1 | 4/2016 | Chan | |
| 2016/0189303 A1 | 6/2016 | Fuchs | |
| 2016/0288797 A1 | 10/2016 | Takahashi et al. | |
| 2016/0364823 A1* | 12/2016 | Cao | G06Q 50/30 |
| 2017/0041737 A1 | 2/2017 | Fischer | |

OTHER PUBLICATIONS

Chawla et. al., "SMOTE: Synthetic Minority Over-sampling Technique", 2002 (Year: 2002).*
He et. al., "Learning from Imbalanced Data", 2009 (Year: 2009).*
PCT International Search Report and Written Opinion, PCT Application No. PCT/IB2017/055230, dated Sep. 6, 2018, 12 pages.
European Patent Office, Extended European Search Report and Opinion, EP Patent Application No. 17861642.1, dated May 25, 2020, 11 pages.

* cited by examiner

PREDICTING SAFETY INCIDENTS USING MACHINE LEARNING

BACKGROUND

Field of Art

This disclosure relates generally to machine learning using one or more computer systems and more particularly to predicting potential safety incidents using machine learning.

Description of Art

Computerized travel coordination systems provide a means of travel by connecting users who need rides (i.e., "riders") with users who can drive them (i.e., "providers"). A rider can submit a request for a ride to the travel coordination system at which point the travel coordination system may select a provider to service the request by transporting the rider to the intended destination.

Because travel coordination systems involve interactions between strangers and travel in vehicles, safety incidents such as dangerous driving incidents and interpersonal conflicts occasionally occur. Such incidents, while rare, can have negative consequences such as property damage and injuries to drivers and passengers. Therefore, it is desirable to minimize occurrences of such safety incidents in travel coordination systems.

SUMMARY

The above and other needs are met by methods, non-transitory computer-readable storage media, and computer systems for predicting potential safety incidents using machine learning.

Examples described herein provide a computer-implemented method for predicting potential safety incidents using machine learning. In one example, the method includes collecting safety data describing safety incidents by providers and/or riders in a computerized travel coordination system and generating a plurality of safety incident prediction models using the safety data. The safety incident prediction models predict likelihoods that providers and/or riders in the computerized travel coordination system will be involved in safety incidents. The method also includes using the plurality of safety incident prediction models to generate a set of predictions indicating probabilities that a given provider in the computerized travel coordination system will be involved in a safety incident in the future, selecting a safety intervention for the given provider responsive to the set of predictions, and performing the selected safety intervention on the given provider. Such a method can be performed by a computer system(s) and/or one or more client devices that communicate with the computer system(s).

Still further, a computer system includes a non-transitory computer-readable storage medium storing instructions executable by a processor for collecting safety data describing safety incidents by providers in a computerized travel coordination system, generating a plurality of safety incident prediction models using the safety data (where the safety incident prediction models predict likelihoods that providers in the computerized travel coordination system will be involved in safety incidents), generating a set of predictions indicating probabilities that a given provider in the computerized travel coordination system will be involved in safety incidents, generating a set of predictions indicating probabilities that a given provider in the computerized travel coordination system will be involved in a safety incident in the future using the plurality of safety incident prediction models, selecting a safety intervention for the given provider responsive to the set of predictions, and performing the selected safety intervention on the given provider.

The features and advantages described in this summary and the following detailed description are not all-inclusive. Many additional features and advantages will be apparent to one of ordinary skill in the art in view of the drawings, specification, and claims hereof.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
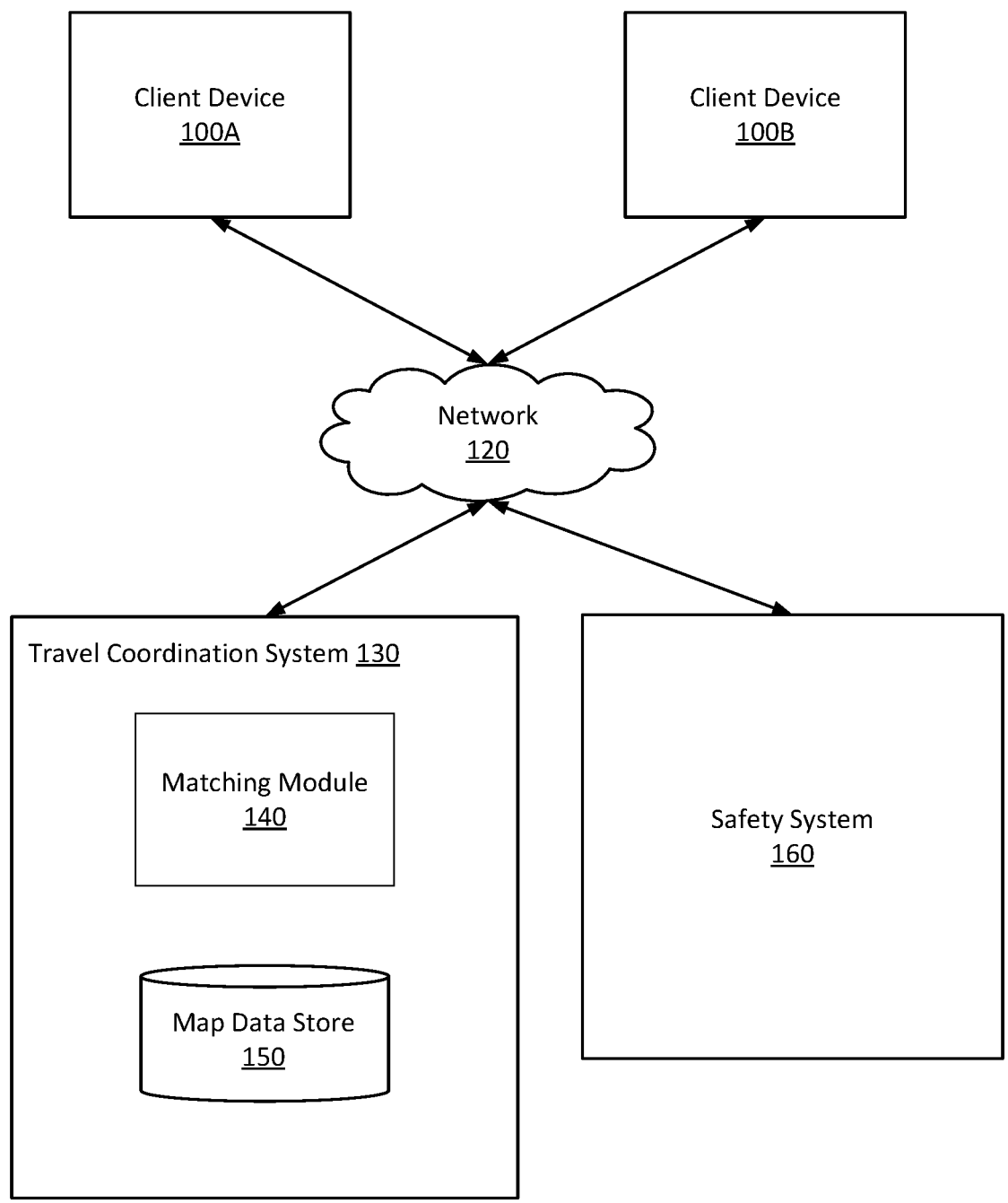
FIG. 1 is a high-level block diagram of a system environment for a travel coordination system and a safety system, in accordance with some embodiments.

FIG. 1 is a high-level block diagram of a system environment for a travel coordination system 130 and a safety system 160, in accordance with some embodiments. FIG. 1 includes a client device 100A, a client device 100B, a network 120, the travel coordination system 130, and a safety system 160. For clarity, although only the client device 100A and the client device 100B are shown in FIG. 1, alternate embodiments of the system environment can have any number of client devices 100, as well as multiple travel coordination systems 130 and safety systems 160. The functions performed by the various entities of FIG. 1 may vary in different embodiments.

A user, such as a rider, can interact with the travel coordination system 130 through a client device 100, such as the client device 100A or the client device 100B, to request transportation or to receive requests to provide transportation. As described herein, a client device 100 can be a personal or mobile computing device, such as a smartphone, a tablet, or a notebook computer. In some embodiments, the client device 100 executes a client application that uses an application programming interface (API) to communicate with the travel coordination system 130 through the network(s) 120.

Through operation of the client device 100A, a user can make a trip request to the travel coordination system 130. For example, a trip request may include user identification information, the number of passengers for the trip, a requested type of the provider (e.g., a vehicle type or service option identifier), the current location and/or the pickup location (e.g., a user-specific location, or a current location of the client device 100), and/or the destination for the trip. The current location of the client device 100 may be designated by the rider, or detected using a location sensor of the client device 100 (e.g., a global positioning system (GPS) receiver).

A user who is a provider can use the client device 100, for example the client device 100B, to interact with the travel coordination system 130 and receive invitations to provide transportation for riders. In some embodiments, the provider is a person operating a vehicle capable of transporting passengers. In some embodiments, the provider is an autonomous vehicle that receives routing instructions from the travel coordination system 130. For convenience, this disclosure generally uses a car with a driver as an example provider. However, the embodiments described herein may be adapted for a provider operating alternative vehicles.

A provider can receive invitations or assignment requests through the client device 100B. An assignment request identifies a rider who submitted a trip request to the travel coordination system 130 and identifies the pickup location of the rider for a trip. For example, the travel coordination system 130 can receive a trip request from a client device 100A of a rider, select a provider from a pool of available (or "open") users to provide the trip, and transmit an assignment request to the selected provider's client device 100B. In some embodiments, a provider can indicate availability, via a client application on the client device 100B, for receiving assignment requests. This availability may also be referred to herein as being "online" (available to receive assignment requests) or "offline" (unavailable to receive assignment requests). For example, a provider can decide to start receiving assignment requests by going online (e.g., by launching a client application or providing input on the client application to indicate that the provider wants to receive invitations), and stop receiving assignment requests by going offline. In some embodiments, when a client device 100B receives an assignment request, the provider has the option of accepting or rejecting the assignment request. By accepting the assignment request, the provider is assigned to the rider, and is provided the rider's trip details, such as pickup location and trip destination location. In one example, the rider's trip details are provided to the client device 100 as part of the invitation or assignment request.

In some embodiments, the travel coordination system 130 provides routing instructions to a provider through the client device 100B when the provider accepts an assignment request. The routing instructions can direct a provider from their current location to the location of the rider or can direct a provider to the rider's destination. The client device 100B can present the routing instructions to the provider in step-by-step instructions or can present the entire route at once.

A client device 100 may interact with the travel coordination system 130 through a client application configured to interact with the travel coordination system 130. The client application of the client device 100 can present information received from the travel coordination system 130 on a user interface, such as a map of the geographic region, and the current location of the client device 100. The client application running on the client device 100 can determine the current location and provide the current location to the travel coordination system 130.

The client devices 100 can communicate with the travel coordination system 130 and/or the safety system 160 via the network 120, which may comprise any combination of local area and wide area networks employing wired or wireless communication links. In one embodiment, the network 120 uses standard communications technologies and protocols. For example, the network 120 includes communication links using technologies such as Ethernet, 802.11, worldwide interoperability for microwave access (WIMAX®), 3G, 4G, code division multiple access (CDMA), digital subscriber line (DSL), etc. Examples of networking protocols used for communicating via the network 120 include multiprotocol label switching (MPLS), transmission control/protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). In some embodiments, all or some of the communication links of the network 120 may be encrypted.

As described above, the travel coordination system 130 matches riders requesting transportation with providers that can transport the riders from their pick up location to their destination. The travel coordination system 130 can store maps of geographic regions in which the travel coordination system 130 services riders and providers, and may provide information about these maps to riders and providers through the client device 100. For example, the travel coordination system 130 may provide routing directions to the provider to pick up the rider and transport the rider to their destination.

The travel coordination system 130 illustrated in the example of FIG. 1 includes a matching module 140 and a map data store 150. Computer components such as web servers, network interfaces, security functions, load balancers, failover servers, management and network operations consoles, and the like are not shown so as to not obscure the details of the system architecture. Additionally, the travel coordination system 130 may contain more, fewer, or different components than those shown in FIG. 1. Furthermore, while examples described herein relate to a transportation service, the travel coordination system 130 can enable other services to be requested by requestors, such as a delivery service, food service, entertainment service, etc., in which a provider is to travel to a particular location.

The matching module 140 selects providers to service the trip requests of riders. The matching module 140 receives a trip request from a rider and determines a set of candidate providers that are online, open (i.e., are available to transport a rider), and near the requested pickup location for the rider. The matching module 140 selects a provider from the set of candidate providers to which it transmits an assignment request. The provider can be selected based on the provider's location, the rider's pickup location, the type of the provider, the amount of time the provider has been waiting for an assignment request and/or the destination of the trip, among other factors. In some embodiments, the matching module 140 selects the provider who is closest to the pickup location or who will take the least amount of time to travel to the pickup location (e.g., having the shortest estimated travel time to the pickup location). The matching module 140 sends an assignment request to the selected provider. If the provider accepts the assignment request, then the matching module 140 assigns the provider to the rider. If the provider rejects the assignment request, then the matching module 140 selects a new provider and sends an assignment request to the client device 100B for that provider.

The map data store 150 stores maps of geographic regions in which the travel coordination system 130 offers trip coordination services. The maps contain information about roads within the geographic regions. For the purposes of this disclosure, roads can include any route between two places that allows travel by foot, motor vehicle, bicycle or other form of travel. Examples of roads include streets, highways, freeways, trails, bridges, tunnels, toll roads, or crossings. Roads may be restricted to certain users, or may be available for public use. Roads can connect to other roads at intersections. An intersection is a section of one or more roads that allows a user to travel from one road to another. Roads are divided into road segments, where road segments are portions of roads that are uninterrupted by intersections with other roads. For example, a road segment would extend between two adjacent intersections on a surface street or between two adjacent entrances/exits on a highway.

A map of a geographic region may be represented using a graph of the road segments. In some embodiments, the nodes of a graph of a map are road segments and edges between road segments represent intersections of road segments. In some embodiments, nodes of the graph represent intersections between road segments and edges represent the road segments themselves. The map data store 150 also stores properties of the map, which may be stored in association with nodes or edges of a graph representing the map. Map properties can include road properties that describe characteristics of the road segments, such as speed limits, road directionality (e.g., one-way, two-way), traffic history, traffic conditions, addresses on the road segment, length of the road segment, and type of the road segment (e.g., surface street, residential, highway, toll). The map properties also can include properties about intersections, such as turn restrictions, light timing information, throughput, and connecting road segments. In some embodiments, the map properties also include properties describing the geographic region as a whole or portions of the geographic region, such as weather within the geographic region, geopolitical boundaries (e.g., city limits, county borders, state borders, country borders), and topological properties.

The safety system 160 receives travel information describing trips coordinated by the travel coordination system 130 and uses the travel information to predict whether specific providers are likely to be involved in safety incidents. The safety system 160 may also perform interventions with providers predicted to be involved in safety incidents. The interventions reduce the likelihood that the predicted safety incidents will actually occur. The types of intervention may be based on the likelihoods of incidents predicted for the specific providers. In the example shown in FIG. 1, the safety system 160 is separate from the travel coordination system 130. However, in other embodiments the safety system 160 is a component of the travel coordination system 130.

In one embodiment, the safety system 160 uses machine learned models (also referred to as "safety incident prediction models") to predict the probabilities that providers are likely to be involved in safety incidents within specified timeframes. The safety incident prediction models are trained using the travel information, as well as other information such as information about the geographic region in which the providers are located. The safety system 160 applies travel information for specific providers to the trained safety incident prediction models and the models output probabilities that those providers will be involved in safety incidents within one or more specified time intervals. Based on the probabilities, the safety system 160 interacts with the travel coordination system 130 and/or providers via the client devices 100 to perform interventions. Generally, the higher the probability that a provider will be involved in a safety incident, the higher the level of intervention performed for that provider.

The safety system 160 thus improves the operation of the travel coordination system 130 by selectively performing interventions with providers. The interventions reduce the likelihood of the providers becoming involved in safety incidents such as dangerous driving and interpersonal conflicts. As a result, the safety of the travel coordination system 130 is increased for both riders and providers.

Figure 2:
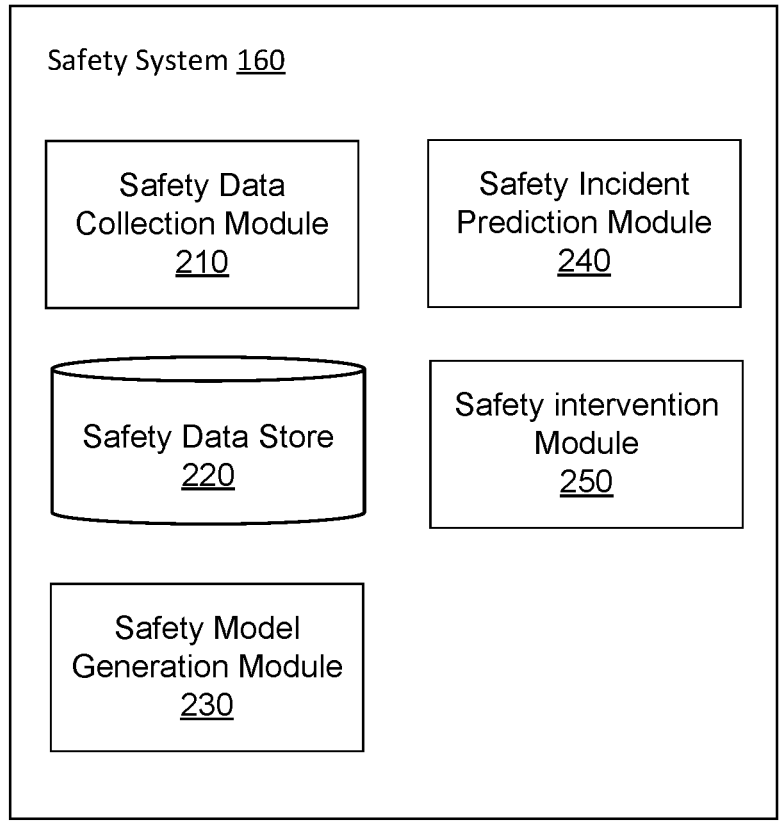
FIG. 2 is a high-level block diagram of a system architecture for a safety system, in accordance with some embodiments.

FIG. 2 is a high-level block diagram of a system architecture for the safety system 160, in accordance with some embodiments. The safety system 160 comprises a safety data collection module 210, a safety data store 220, a safety model generation module 230, a safety incident prediction module 240, and a safety intervention module 250. The safety system 160 may include additional, fewer, or different components from those shown in FIG. 2 and the functionality of the components as described herein may be distributed differently from the description herein.

The safety data collection module 210 receives travel information from the travel coordination system 130. Generally, the safety data collection module 210 receives travel information related to safety, referred to herein as "safety data." Depending upon the embodiment, the safety data collection module 210 may receive travel information that has already been filtered (e.g., by the travel coordination system 130) to contain only travel information related to safety. Alternatively, or in addition, the safety data collection module 210 may filter the travel information to isolate and thereby collect only travel information related to safety. The safety data collection module 210 may receive the travel information in batches or it may receive a continuous stream of information. In one embodiment, the travel information is represented as time series data (i.e., data showing occurrences over time).

The travel information related to safety describe variables (also referred to as "predictors") that are related to safety incidents. In addition, the travel information identifies safety incidents that actually occurred, and the predictors associated with those safety incidents. Due to the relative rarity of actual safety incidents, the bulk of the predictors will not be associated with actual safety incidents. However, some predictors will be associated with such incidents (e.g., car accidents, personal injuries, etc.).

The predictors collected by the safety data collection module 210 include provider level predictors and city level predictors. In some embodiments, the predictors collected by the safety data collection module 210 further include rider level predictors and environmental predictors. Provider level predictors relate to a provider's quality of controlling the vehicle carrying the rider (e.g., the provider's quality of driving). Provider level predictors may also relate to a provider's interpersonal behavior, ability to cooperatively interact with strangers, trustworthiness (e.g., as determined by psychometric tests), and history of criminal or driving violations surfaced through background checks. Provider level predictors may include subjective evaluations of the provider made by riders using the riders' client devices 100. The subjective evaluations may include, for example, ratings of the provider's driving quality and vehicle cleanliness, unstructured rider feedback regarding the provider, and support tickets or safety complaints submitted about the provider's attitude, dangerous driving, or inappropriate behavior. To overcome potential reporting biases of subjective rider feedback (e.g., due to over reporting by some riders and under reporting by others), rider reports may be supplemented with reports from official sources, in one embodiment. Official sources include insurance claims, police reports, and hospital records.

Provider level predictors may also include provider performance data observed by the travel coordination system 130. The provider performance data may include a provider's average number of trips over a period of time, a provider's times online and/or on trip (e.g., days and times during the week), and the number of safety incidents in which a provider has been involved previously. Additionally, the provider performance data may include the percentage of trips the provider cancels.

Provider level predictors may also include telematics data describing the driving performance of the provider. Such telematics data may be collected by the provider's client device 100 using sensors on the device and/or sensors in the provider's vehicle that communicate with the client device or otherwise communicate with the travel coordination system 130. The telematics data may describe, for example, the numbers of times the provider has engaged in hard braking, hard accelerations, or speeding incidents within one or more time intervals.

Further, as an addition or an alternative, the safety data collection module 210 also receives travel information related to social network usage of providers and generates provider level predictors from this usage. Provider level predictors of a given provider's social network peers are relevant to the given provider because socially-connected providers tend to have similar driving habits. Therefore, the safety data collection module 210 uses provider level predictors of other providers socially-connected with the given provider as predictors for the given provider.

City level predictors relate to municipal or regional characteristics that may affect the likelihood that safety incidents will occur in a particular geographic area. City level predictors include weather conditions for the geographic area. The weather conditions may include actual historic weather conditions for given time periods, as well as predicted weather or general weather patterns for time periods. City level predictors also include aggregate information about the geographic area, such as the number of trips provided in the city in a time period and the number of complaints against providers in the area over a time period.

The predictors may include both the actual, raw value for a given safety variable and the change in the variable over time. For example, a provider level predictor related to hard braking may include the number of hard braking incidents during a time period, and the rate and magnitude of change in hard braking incidents across multiple time periods. Likewise, a city level predictor related to number of trips in a geographic area may include the number of trips in the area during a time period, and the rate and magnitude of change in the number of trips across multiple time periods.

The safety data store 220 stores data used by the safety system 160 for predicting potential safety incidents and performing interventions. The safety data store 220 stores data used and generated by other components of the safety system 160, such as the safety data collection module 210, the safety model generation module 230, the safety incident prediction module 240, and the safety intervention module 250. The stored data may include predictors, models, training data for training the machine learning models, and prediction results.

The safety model generation module 230 generates safety incident prediction models. These models predict which providers will be involved in a safety incident within multiple specified timeframes. Multiple models may be generated. For example, separate models that predict the likelihood that given drivers will be involved in safety incidents within the next seven, 14, 30, and 60 days can be respectively generated.

In one embodiment, the safety model generation module 230 generates separate models for predicting dangerous driving incidents and interpersonal conflict incidents. Furthermore, the safety model generation module 230 may generate separate models for different cities and/or other geographic areas. In one embodiment, the safety model generation module 230 generates separate models for large cities (e.g., cities with more than a threshold number of providers) and generates aggregate models for smaller cities (e.g., cities with fewer than the threshold number of providers). The aggregate models represent geographic areas incorporating multiple cities. The safety model generation module 230 may also generate a hierarchy of models, with child nodes in the hierarchy representing smaller geographic areas (e.g., cities) and parent nodes representing larger geographic areas (e.g., states or other regions incorporating multiple cities). In one embodiment, if an initial use of a child model is determined to be ineffective for a city or other geographic area (i.e., it is not accurately predicting safety incidents) then a parent model in the hierarchy is substituted for the ineffective model.

An embodiment of the safety model generation module 230 generates the safety incident prediction models using supervised machine learning. The safety model generation module 230 trains and validates the models using training data derived from the safety data collected by the safety data collection module 210. The safety model generation module 230 may use different sets of training data to generate the different models. For example, a model for a specific city may use only training data associated with that city. In one embodiment, the safety incident prediction models are regenerated using updated training data on a periodic basis, such as every 30 days. In some embodiments, the safety incident prediction models are regenerated whenever updated training data is received.

To generate the training data, the safety model generation module 230 obtains a random set of safety data from the safety data store 220. Because safety incidents are uncommon, the bulk of data in the random set will not be associated with actual safety incidents. The safety model generation module 230 randomly removes safety data not associated with actual safety incidents from the set, until the set contains a specified ratio of safety data associated with safety incidents to safety data not associated with safety incidents. In one embodiment, this ratio is 50/50. In other examples, the ratio can be configured to be different than 50/50, such as 60/40 or 30/70, etc. The set containing the desired ratio of safety data is the training data.

The safety model generation module 230 may refine the training data to enhance the model generation. In one embodiment, the predictors in the training data are centered and scaled to have a mean of 0 and a standard deviation of 1. Additionally, the safety model generation module 230 removes any predictors with near zero variance, and detects and computes pair-wise correlations for highly-correlated predictors, and removes one of the pairs.

The safety model generation module 230 partitions the training data into a training set and a validation set. The safety model generation module 230 uses the training set to train one or more safety incident prediction models using supervised machine learning. The models are trained using one or more techniques including stochastic gradient boosting, AdaBoost (boosted classification trees), random forests, deep learning and support vector machine algorithms. In one embodiment, the dangerous driving and interpersonal conflict models are generated using the same techniques but with different response variables.

The safety model generation module 230 tests the generated models using the validation set of training data. The testing may use k-fold cross-validation techniques. Models that fail the testing are re-trained using additional and/or different training data. Alternatively, models that fail the testing may be disregarded in favor of different models. For example, a model that fails training for a city may be not be used; the model for a geographic area that includes the city may be used instead. Generally, the testing measures the performance of the models with respect to precision (i.e., the number of identified true positive incidents divided by the total number of identified true positive incidents and false positive incidents) and recall (i.e., the number of identified true positive incidents divided by the total number of identified true positive incidents and false negative incidents). Models that fail to meet threshold levels of precision and/or recall are considered to have failed testing.

The safety incident prediction module 240 uses the safety incident prediction models to make predictions about future safety incidents involving the travel coordination system 130. In one embodiment, the safety incident prediction module 240 obtains safety data for a given provider, and applies one or more of the generated safety incident prediction models to the provider data. The one or more models operate on the data and generate outputs indicating probabilities that the provider will be involved in a safety incident. For example, models for predicting whether the provider will be involved in safety incidents in the next seven, 14, 30, and 60 days can be applied to the data. The output of each model is a value, e.g., a number between zero and one, indicating the predicted probability that the provider will be involved in a safety incident. According to an embodiment, a predefined set number of predictions (e.g., eight predictions) are determined for each driver each day (i.e., the likelihood of involvement in a dangerous driving incident within seven, 14, 30, and 60 days and the likelihood of involvement in an interpersonal conflict incident within seven, 14, 30, and 60 days).

The safety intervention module 250 selects and performs appropriate safety interventions in response to predicted safety incidents. Generally, the probability of being involved in a safety incident is close to zero for most providers because safety incidents are rare. Interventions are performed for providers who receive probabilities higher than zero. Generally, the safety intervention module 250 performs interventions by interacting with the providers' client devices 100 to effect the intervention. The interventions decrease the likelihoods that the providers will be involved in safety incidents and thereby improve the safety and performance of the travel coordination system 130.

There are multiple different types of interventions that may be performed. In one embodiment, the safety intervention module 250 assigns each possible intervention an impact score. The impact score measures the impact of the intervention on the travel coordination system 130 and/or the provider. Interventions that have a relatively low impact on the travel coordination system 130 and/or provider have a relatively low impact score, while interventions that have a relatively high impact on the travel coordination system 130 and/or provider have a relatively high impact score. "Impact" refers to the technical and/or administrative overhead of the intervention on the travel coordination system 130 and/or the provider. In one embodiment, the interventions and the impact scores can be changed in response to measurements of the effectiveness of an intervention at preventing safety incidents (e.g., via an ongoing process of experimentation). In this way, interventions and their impact scores are designed to be appropriate to the region or context in which the provider operates.

Possible interventions include sending electronic messages to the client devices 100 of the providers. The messages may remind the providers to avoid causing safety incidents, such as a message reminding the providers to drive safely. Sending such electronic messages has a relatively low impact score. Another intervention is requiring a provider to perform an identification check. The identification check requires the provider to submit a photograph, fingerprint, or other verifiable data using the provider's client device 100 in order to verify that the identified provider is the actual provider (i.e., that the provider is not an imposter). The identification check intervention has a medium impact score greater than the messaging intervention impact score. Other possible interventions having high impact scores greater than the identification check intervention include requiring the provider to establish a mentoring relationship with another provider, requiring the provider to undergo safety training before being allowed to provide rides using the travel coordination system 130, activating audio and/or video recording in the provider's vehicle, and requiring the provider to stop using the travel coordination system 130 to provide rides for at least a predetermined amount of time.

The safety intervention module 250 determines the intervention to perform for a given provider based on the provider's probability of being involved in a safety incident and the impact scores of the interventions. In one embodiment, the safety intervention module 250 maps a set of potential interventions to ranges of probabilities, with potential interventions having comparatively higher impact scores mapped to comparatively higher probabilities of a safety incident occurring, and then applies the mapped-to intervention based on the driver's safety incident probability. For example, the safety intervention module 250 may send the provider a safety reminder message if the provider has a probability of a safety incident between 0 and 3 percent, require the provider to establish a mentoring relationship with another provider if the probability is between 3 and 6 percent, and require the driver to stop driving for a week if the probability is greater than 6 percent.

Figure 3:
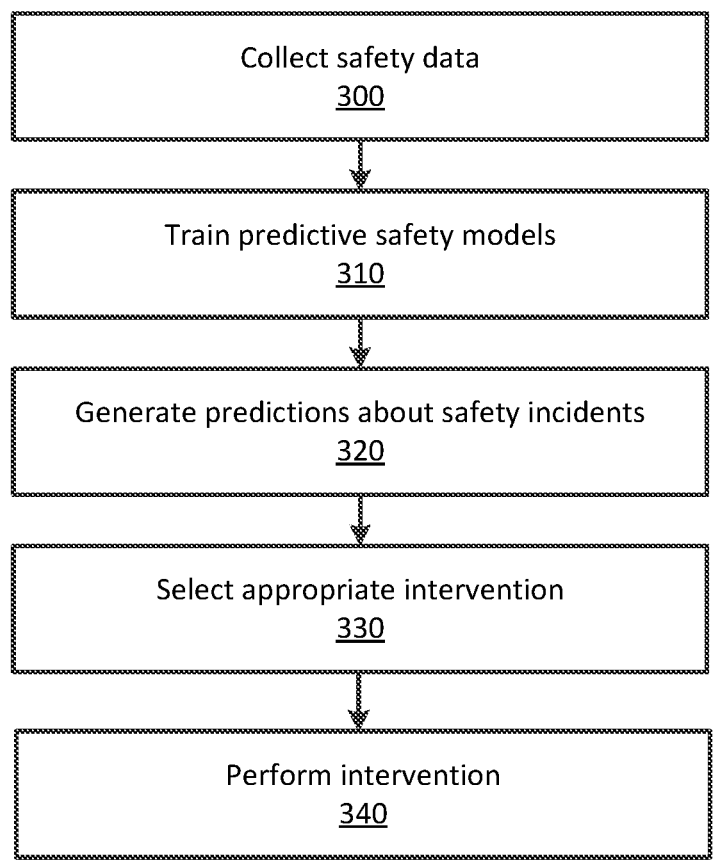
FIG. 3 is a flowchart illustrating a method of predicting potential safety incidents, in accordance with some embodiments.

FIG. 3 is a flowchart illustrating a method of predicting potential safety incidents, in accordance with some embodiments. Alternate embodiments of FIG. 3 may include more, fewer, or different steps, and the steps may be performed in an order different from what is illustrated in FIG. 3 and described herein.

The safety system 160 collects 300 safety data describing variables that are related to safety incidents. These variables include driver level predictors and city level predictors. The safety system uses supervised machine learning techniques to train 310 safety incident prediction models. The safety incident prediction models may include dangerous driving incident models and interpersonal conflict incident models. The safety system uses the models to generate 320 predictions about whether specific providers are likely to be involved in safety incidents. In one embodiment, the safety system predicts whether a provider is likely to be involved in dangerous driving incidents within the next seven, 14, 30, and 60 days, and whether the provider is likely to be involved in an interpersonal conflict incident within the next seven, 14, 30, and 60 days. In response to the predicted likelihood that a provider will be involved in a safety incident, the safety system 160 selects 330 and performs 340 an appropriate safety intervention. According to one embodiment, interventions having higher impact scores are performed for providers who have greater predicted probabilities of being involved in a safety incident.

Example Hardware Architecture

Figure 4:
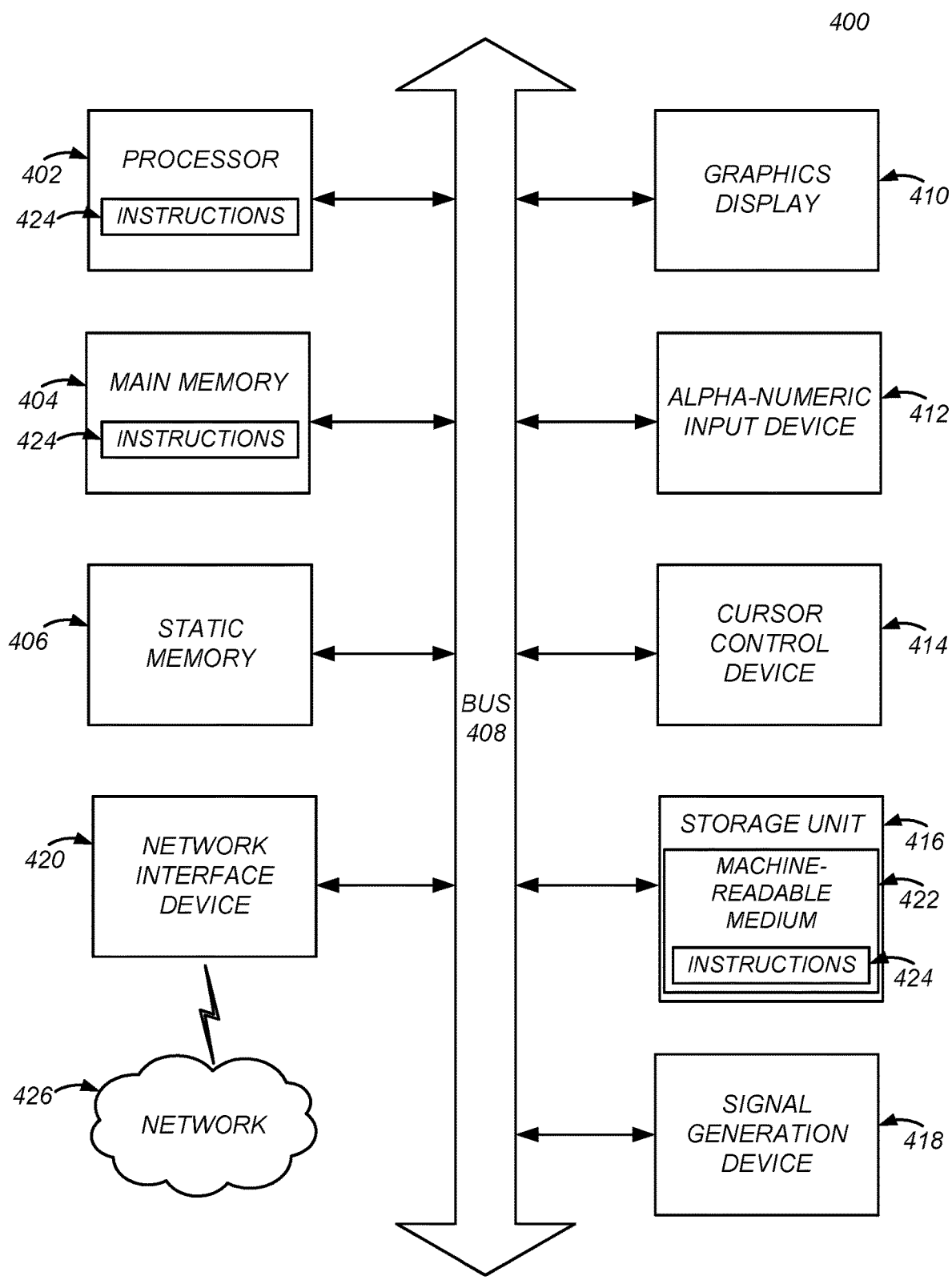
FIG. 4 illustrates an example hardware architecture of a computer system, such as a travel coordination system or a safety system, in accordance with some embodiments.

FIG. 4 illustrates an example hardware architecture of a computer system 400, such as a travel coordination system 130 or a safety system 160, in accordance with some embodiments. The illustrated computer system 400 includes a processor 402, a main memory 404, a static memory 406, a bus 408, a graphics display 410, an alpha-numeric input device 412, a cursor control device 414, a storage unit 416, a signal generation device 418, and a network interface device 420. In alternative configurations, additional, fewer, or different components may be included in computer system 400 than those described in FIG. 4.

The computer system 400 can be used to execute instructions 424 (e.g., program code or software) for causing the computer system 400 to perform any one or more of the methodologies (or processes) described herein. In alternative embodiments, the computer system 400 operates as a standalone device or a connected (e.g. networked) device that connects to other computer systems 400. In a networked deployment, the computer system 400 may operate in the capacity of a server machine.

The computer system 400 may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated in FIG. 4, the term "computer system" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 404. The computer system may include a storage unit 416. The processor 402, memory 404, and the storage unit 416 communicate via a bus 408.

In addition, the computer system 400 can include a static memory 406, a display driver 410 (e.g., to drive a plasma display panel (PDP), a liquid crystal display (LCD), or a projector). The computer system 400 may also include alphanumeric input device 412 (e.g., a keyboard), a cursor control device 414 (e.g. a mouse, a trackball, a joystick, a motion sensor, or other pointing instrument), a signal generation device 418 (e.g. a speaker), and a network interface device 420, which also are configured to communicate via the bus 408.

The storage unit 416 includes a machine-readable medium 422 on which is stored instructions 424 (e.g. software) embodying any one or more of the methodologies or functions described herein. The instructions 424 may also reside, completely or at least partially, within the main memory 404 or within the processor 402 (e.g. within a processor's cache memory) during execution thereof by the computer system 400, the main memory 404 and the processor 402 also constituting machine-readable media. The instructions 424 may be transmitted or received over a network 426 via the network interface device 420.

While machine-readable medium 422 is shown in an example embodiment to be a single medium, the term "machine-readable medium" should be taken to include a single medium or multiple media (e.g. a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Figure 5:
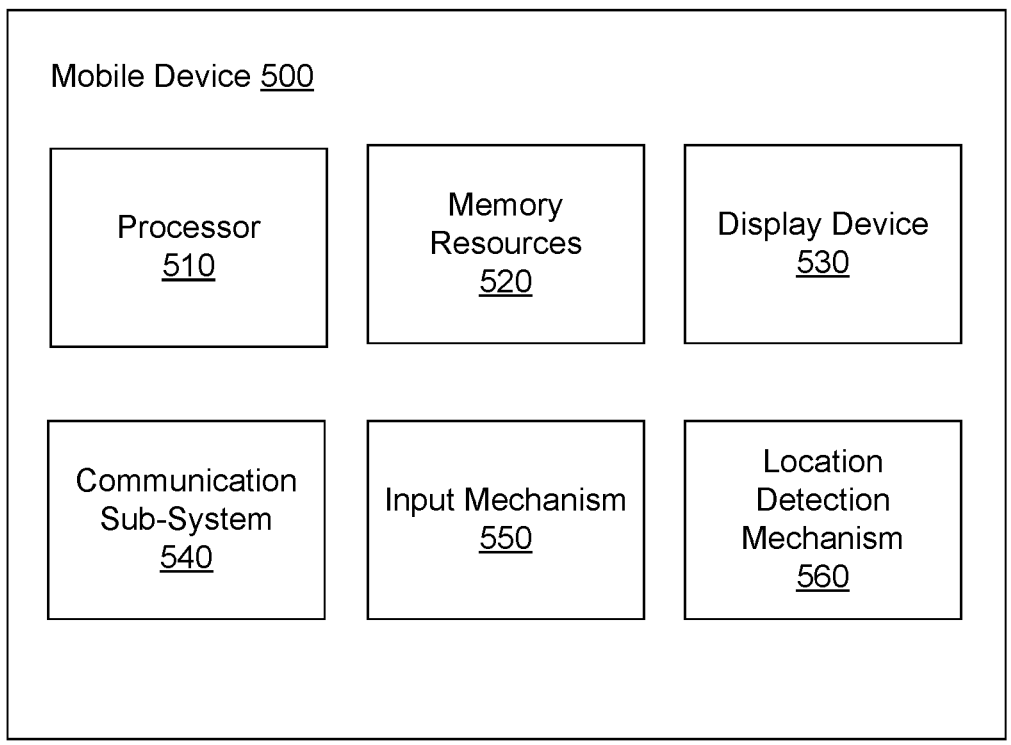
FIG. 5 illustrates a mobile computing device upon which examples described herein may be implemented, according to an embodiment.

FIG. 5 illustrates a mobile computing device upon which examples described herein may be implemented. In one example, a mobile device 500 may correspond to a mobile computing device, such as a cellular device that is capable of telephony, messaging, and data services. The mobile device 500 can correspond to a client device 100. Examples of such devices include smartphones, handsets, or tablet devices for cellular carriers. The computing device 500 includes a processor 510, memory resources 520, a display device 530 (e.g. a touch-sensitive display device), one or more communication sub-systems 540 (including wireless communication sub-systems), input mechanisms 550 (e.g. an input mechanism can include or be part of the touch-sensitive display device), and one or more location detection mechanisms (e.g. GPS component) 560. In one example, at least one of the communication sub-systems 540 sends and receives cellular data over data channels and voice channels.

The processor 510 is configured with software and/or other logic to perform one or more processes, steps and other functions described herein. The processor 510 is configured, with instructions and data stored in the memory resources 520, to operate a client application Instructions for operating the client application in order to display various user interfaces can be stored in the memory resources 520 of the computing device 500.

The location detection mechanism 560 can determine location information, such as the geographic location of the mobile device 500. The geographic location of the mobile device 500 can be wirelessly transmitted to the travel coordination system 130 via the communication subsystems 540 periodically or as part of ordinary communication with the travel coordination system 130. The travel coordination system 130 can receive the geographic location from the mobile device 500 (or a user-specific location data point corresponding to a selected pickup location) and can select a provider to service a trip request from a rider based on the geographic location. The travel coordination system 130 can also transmit a notification to the mobile device 500 via the communication sub-systems 540 if the trip price estimate is less than a target price set by the rider and the travel coordination system is able to service the trip request. The notification can be processed by the processor 510 to provide the notification as content as part of a user interface on the display 530.

For example, the processor 510 can provide a variety of content to the display 530 by executing instructions and/or applications that are stored in the memory resources 520. One or more user interfaces can be provided by the processor 510, such as a user interface for the service application. While FIG. 5 is illustrated for a mobile device, one or more examples may be implemented on other types of devices such as laptop and desktop computers.

Additional Configurations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure. For example, while the present disclosure discusses predicting provider involvement in potential safety incidents, the methods and systems herein can be used more generally for any purpose where one would want to predict involvement in potential incidents using a machine learning model.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method comprising:
   collecting trip data associated with trips by providers of a computerized travel coordination system, the trip data including trips that have safety incidents, wherein safety incidents include dangerous driving incidents and interpersonal conflicts, and further including trips that do not have safety incidents;
   generating a plurality of safety incident prediction models using the trip data, the safety incident prediction models predicting likelihoods that providers of the computerized travel coordination system will be involved in safety incidents, wherein generating the plurality of safety incident prediction models comprises:
      obtaining a set of training data from the collected trip data;
      adjusting the set of training data by randomly removing data about trips that do not have safety incidents from the set of training data to generate an adjusted training set that includes a specified ratio of trip data for trips that have safety incidents to trip data for trips that do not have safety incidents;
      generating, for each of a set of multiple specified timeframes, a dangerous driving incident prediction model for determining probabilities that providers will be involved in dangerous driving incidents within the specified timeframe;
      training the generated dangerous driving incident prediction models with the adjusted training set using response variables that are indicative of the occurrence of dangerous driving incidents;
      generating, for each of a set of multiple specified timeframes, an interpersonal conflict incident prediction model for determining probabilities that providers will be involved in interpersonal conflict incidents within the specified timeframe; and
      training the generated interpersonal conflict incident prediction models with the adjusted training set using response variables that are indicative of the occurrence of interpersonal conflicts;
   generating a set of predictions indicating probabilities that a given provider of the computerized travel coordination system will be involved in a safety incident in the future using the plurality of safety incident prediction models comprising the trained dangerous driving incident prediction models and the trained interpersonal conflict incident prediction models;
   selecting a safety intervention for the given provider responsive to the set of predictions; and
   performing the selected safety intervention on the given provider.

2. The computer-implemented method of claim 1, wherein collecting trip data comprises:
   collecting provider level predictors relating to the providers' quality of controlling vehicles carrying riders; and
   collecting city level predictors relating to likelihoods that safety incidents will occur in particular geographical areas;
   wherein the plurality of safety incident prediction models are generated using the provider level predictors and the city level predictors.

3. The computer-implemented method of claim 1, wherein selecting the safety intervention for the given provider responsive to the set of predictions comprises:
   identifying a set of potential safety interventions for the provider;

assigning an impact score to each potential safety intervention in the identified set; and selecting the safety intervention for the given provider responsive to the assigned impact scores and the probabilities that the given provider will be involved in a safety incident in the future.

4. The computer-implemented method of claim 3, wherein selecting the safety intervention for the given provider responsive to the assigned impact scores comprises:

mapping the set of potential safety interventions to ranges of probabilities, with potential interventions having comparatively higher impact scores mapped to comparatively higher probabilities of a safety incident occurring; and selecting the safety intervention responsive to the mapping.

5. The computer-implemented method of claim 1, wherein generating the plurality of safety incident prediction models using the trip data comprises:

training the safety incident prediction models using supervised machine learning.

6. A computer system comprising:

a computer processor for executing computer program instructions; and a non-transitory computer-readable storage medium storing instructions executable by the processor to perform steps comprising:

collecting trip data associated with trips by providers in a computerized travel coordination system, the trip data including trips that have safety incidents, wherein safety incidents include dangerous driving incidents and interpersonal conflicts, and further including trips that do not have safety incidents;

generating a plurality of safety incident prediction models using the trip data, the safety incident prediction models predicting likelihoods that providers in the computerized travel coordination system will be involved in safety incidents, wherein generating the plurality of safety incident prediction models comprises:

obtaining a set of training data from the collected trip data;

adjusting the set of training data by randomly removing data about trips that do not have safety incidents from the set of training data to generate an adjusted training set that includes a specified ratio of trip data for trips that have safety incidents to trip data for trips that do not have safety incidents;

generating, for each of a set of multiple specified timeframes, a dangerous driving incident prediction model for determining probabilities that providers will be involved in dangerous driving incidents within the specified timeframe;

training the generated dangerous driving incident prediction models with the adjusted training set using response variables that are indicative of the occurrence of dangerous driving incidents;

generating, for each of a set of multiple specified timeframes, an interpersonal conflict incident prediction model for determining probabilities that providers will be involved in interpersonal conflict incidents within the specified timeframe; and training the generated interpersonal conflict incident prediction models with the adjusted training set using response variables that are indicative of the occurrence of interpersonal conflicts;

generating a set of predictions indicating probabilities that a given provider in the computerized travel coordination system will be involved in a safety incident in the future using the plurality of safety incident prediction models comprising the trained dangerous driving incident prediction models and the trained interpersonal conflict incident prediction models;

selecting a safety intervention for the given provider responsive to the set of predictions; and performing the selected safety intervention on the given provider.

7. The computer system of claim 6, wherein collecting trip data comprises:

collecting provider level predictors relating to the providers' quality of controlling vehicles carrying riders; and collecting city level predictors relating to likelihoods that safety incidents will occur in particular geographical areas;

wherein the plurality of safety incident prediction models are generated using the provider level predictors and the city level predictors.

8. The computer system of claim 6, wherein selecting the safety intervention for the given provider responsive to the set of predictions comprises:

identifying a set of potential safety interventions for the provider;

assigning an impact score to each potential safety intervention in the identified set; and selecting the safety intervention for the given provider responsive to the assigned impact scores and the probabilities that the given provider will be involved in a safety incident in the future.

9. The computer system of claim 8, wherein selecting the safety intervention for the given provider responsive to the assigned impact scores comprises:

mapping the set of potential safety interventions to ranges of probabilities, with potential interventions having comparatively higher impact scores mapped to comparatively higher probabilities of a safety incident occurring; and selecting the safety intervention responsive to the mapping.

10. The computer system of claim 6, wherein generating the plurality of safety incident prediction models using the trip data comprises:

training the safety incident prediction models using supervised machine learning.

11. A non-transitory computer-readable storage medium storing computer program instructions executable by a processor to perform steps comprising:

collecting trip data associated with trips by providers in a computerized travel coordination system, the trip data including trips that have safety incidents, wherein safety incidents include dangerous driving incidents and interpersonal conflicts, and further including trips that do not have safety incidents;

generating a plurality of safety incident prediction models using the trip data, the safety incident prediction models predicting likelihoods that providers in the computerized travel coordination system will be involved in safety incidents, wherein generating the plurality of safety incident prediction models comprises:

obtaining a set of training data from the collected trip data;

adjusting the set of training data by randomly removing data about trips that do not have safety incidents from the set of training data to generate an adjusted training set that includes a specified ratio of trip data for trips that have safety incidents to trip data for trips that do not have safety incidents;

generating, for each of a set of multiple specified timeframes, a dangerous driving incident prediction model for determining probabilities that providers will be involved in dangerous driving incidents within the specified timeframe;

training the generated dangerous driving incident prediction models with the adjusted training set using response variables that are indicative of the occurrence of dangerous driving incidents;

generating, for each of a set of multiple specified timeframes, an interpersonal conflict incident prediction model for determining probabilities that providers will be involved in interpersonal conflict incidents within the specified timeframe; and training the generated interpersonal conflict incident prediction models with the adjusted training set using response variables that are indicative of the occurrence of interpersonal conflicts;

generating a set of predictions indicating probabilities that a given provider in the computerized travel coordination system will be involved in a safety incident in the future using the plurality of safety incident prediction models comprising the trained dangerous driving incident prediction models and the trained interpersonal conflict incident prediction models;

selecting a safety intervention for the given provider responsive to the set of predictions; and performing the selected safety intervention on the given provider.

12. The non-transitory computer-readable storage medium of claim 11, wherein collecting trip data comprises:
   collecting provider level predictors relating to the providers' quality of controlling vehicles carrying riders; and
   collecting city level predictors relating to likelihoods that safety incidents will occur in particular geographical areas;
   wherein the plurality of safety incident prediction models are generated using the provider level predictors and the city level predictors.

13. The non-transitory computer-readable storage medium of claim 11, wherein selecting the safety intervention for the given provider responsive to the set of predictions comprises:
   identifying a set of potential safety interventions for the provider;
   assigning an impact score to each potential safety intervention in the identified set; and
   selecting the safety intervention for the given provider responsive to the assigned impact scores and the probabilities that the given provider will be involved in a safety incident in the future.

14. The non-transitory computer-readable storage medium of claim 13, wherein selecting the safety intervention for the given provider responsive to the assigned impact scores comprises:
   mapping the set of potential safety interventions to ranges of probabilities, with potential interventions having comparatively higher impact scores mapped to comparatively higher probabilities of a safety incident occurring; and
   selecting the safety intervention responsive to the mapping.

* * * * *